(12) United States Patent
Foote et al.

(10) Patent No.: US 9,251,153 B1
(45) Date of Patent: Feb. 2, 2016

(54) SYSTEMS AND METHODS FOR POPULATING AND MAINTAINING A LOCAL CACHE WITH ARCHIVED DATA ITEMS

(75) Inventors: Christopher Foote, Aldermaston Wharf (GB); Benjamin Heymink, Kennet Island (GB); Adrian Marshall, Tilehurst (GB)

(73) Assignee: Symantec Corporation, Mountain View, CA (US)

( * ) Notice: Subject to any disclaimer, the term of this patent is extended or adjusted under 35 U.S.C. 154(b) by 996 days.

(21) Appl. No.: 12/606,391

(22) Filed: Oct. 27, 2009

(51) Int. Cl.
*G06F 17/00* (2006.01)
*G06F 17/30* (2006.01)

(52) U.S. Cl.
CPC ............... *G06F 17/30073* (2013.01)

(58) Field of Classification Search
CPC .................................................. G06F 17/30073
USPC .......................................................... 707/763
See application file for complete search history.

(56) References Cited

U.S. PATENT DOCUMENTS

| | | | |
|---|---|---|---|
| 6,615,253 B1 * | 9/2003 | Bowman-Amuah | 709/219 |
| 7,730,148 B1 * | 6/2010 | Mace et al. | 709/206 |
| 7,882,077 B2 * | 2/2011 | Gokhale et al. | 707/673 |
| 2008/0028028 A1 * | 1/2008 | Chismark | 709/206 |
| 2008/0034039 A1 * | 2/2008 | Cisler et al. | 709/204 |
| 2008/0104022 A1 * | 5/2008 | Ronca | 707/3 |
| 2008/0126300 A1 * | 5/2008 | Boss et al. | 707/3 |
| 2008/0294674 A1 * | 11/2008 | Reztlaff et al. | 707/102 |
| 2009/0006499 A1 * | 1/2009 | Mukhi et al. | 707/204 |
| 2010/0138882 A1 * | 6/2010 | Ellis et al. | 725/93 |

OTHER PUBLICATIONS

Website: http://chucksblog.emc.com/chucks_bolg/2009/04/say-hello-to-emc-sourceone-1.html, *Say Hello to EMC SourceOne*, Dec. 21, 2009 (6 pgs.).
Website: http://www.uk.emc.com/collateral/article/10-key-considerations-email-archiving.pdf, *10 Key Considerations for Email Archiving*, Dec. 21, 2009 (6 pgs.).
Website: http://www.lionbridge.com/competitive_analysis/reports/emc/EX_user_cache_and_symantec_EV_offline_vault_comparative_study_022807.pdf, *EMC EmailXtender with User Cache vs. Symantec Enterprise Vault with Offline Vault*, Sep. 2006 (18 pgs.).

* cited by examiner

*Primary Examiner* — Mariela Reyes
*Assistant Examiner* — Mohsen Almani
(74) *Attorney, Agent, or Firm* — Holland & Hart, LLP (57) ABSTRACT

A computer-implemented method for populating and maintaining a local cache with archived data items is described. A request to organize archived data items into one or more bundles is sent. The one or more bundles of archived data items are downloaded to the local cache. Each of the archived data items are organized in the one or more bundles according to a time period associated with each archived data item. An index file is extracted from each of the one or more bundles. The extracted index file is inserted into a master index file.

18 Claims, 9 Drawing Sheets

SYSTEMS AND METHODS FOR POPULATING AND MAINTAINING A LOCAL CACHE WITH ARCHIVED DATA ITEMS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. These demands include demands to improve security related to information that may be created on a computer and/or shared between users of multiple computers. For example, users of computer technologies may store copies of data items in the event of a system failure that may render the data items inaccessible. In other words, users of computer technologies may archive copies of the data items in order to preserve the data in the event the original data is lost or corrupted.

Archived data may be accessed from the location via a network connection. An individual, however, may not always be in a location that allows him/her to connect to the secure network connection to retrieve archived data. As a result, benefits may be realized by providing improved systems and methods for populating and maintaining a local cache of archived data items so that a user may access these archived data items even when a network connection is unavailable.

SUMMARY

According to at least one embodiment, a computer-implemented method for populating and maintaining a local cache with archived data items is described. A request to organize archived data items into one or more bundles is sent. The one or more bundles of archived data items are downloaded to the local cache. Each of the archived data items are organized in the one or more bundles according to a time period associated with each archived data item. An index file is extracted from each of the one or more bundles. The extracted index file is inserted into a master index file.

In one embodiment, a server may be polled to determine when the requested one or more bundles are created. A verification may be made as to whether one or more additional data items have been archived subsequent to sending the request to organize archived data items into the one or more bundles. A request to organize the one or more additional data items into an additional bundle may be sent. In one configuration, the additional bundle of the one or more additional data items may be downloaded to the local cache. The one or more additional data items may be merged into a bundle previously downloaded to the local cache.

A verification may be made as to whether an occupied space threshold relating to the available space of a local disk is satisfied. The downloading of the one or more bundles may be prevented upon verification that the occupied space threshold is satisfied. In one embodiment, a bundle may be selected to be removed from the local cache upon verification that the occupied space threshold is satisfied.

A computer system configured to populate and maintain a local cache with archived data items is also described. The computer system may include a processor and memory in electronic communication with the processor. The computer system may also include a cache creation agent configured to send a request to organize archived data items into one or more bundles, and download the one or more bundles of archived data items to the local cache. Each of the archived data items may be organized in the one or more bundles according to a time period associated with each archived data item. The agent may be further configured to extract an index file from each of the one or more bundles, and insert the extracted index file into a master index file.

A computer-program product for populating and maintaining a local cache with archived data items is also described. The computer-program product may include a computer-readable medium having instructions thereon. The instructions may include code programmed to send a request to organize archived data items into one or more bundles, and code programmed to download the one or more bundles of archived data items to the local cache. Each of the archived data items may be organized in the one or more bundles according to a time period associated with each archived data item. The instructions may further include code programmed to extract an index file from each of the one or more bundles, and code programmed to insert the extracted index file into a master index file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Many businesses, individuals, etc. use and rely on computing technologies. Data that is created and stored on computers may include important, sensitive information. In the event of a computer failure, data stored on the computer may become lost and unrecoverable. In order to prevent the permanent loss of important data, users of computing technologies may use archiving techniques to preserve copies of data in a secure location. The secure location may be a server connected to the user's computer across a network connection. If the original data becomes lost or corrupted, an archived copy of the data may be accessed across the network connection in order to restore the data.

Data archiving, however, may create difficulties for users that are unable to access archived data because a network connection is unavailable. For example, a traveling user who wishes to read archived email messages may not be able to do so if a network connection is unavailable. Previous efforts to overcome this problem built a local cache on the user's computer that included copies of the archived data. These previous efforts, however, download copies of the archived data into the local cache in the order the data was archived. In addition, each archived data item was downloaded one at a time into the local cache. In other words, the first data item archived is the first data item placed in the local cache. As a result, the previous efforts populated the local cache with archived data items, but these efforts caused a frustration because users desire to access their most recent items first. In other words, users may desire to access the last data item archived before other archived items because this data item may be the data item most relevant to the user. In addition, the previous efforts caused the available network bandwidth to decrease during time periods when a high volume of users were updating their local cache with archived data items.

In one embodiment, the present systems and methods build and maintain a local cache in an effective way by continually placing a bias to the most recently archived data. In other words, the present systems and methods populate the local cache beginning with the most recently archived data item. Additionally, when the local disk space is occupied with a certain amount of data, a bundle of data items (including appropriate indexes associated with the bundle) in the local cache may be automatically trimmed, or deleted from the cache. In one configuration, the archived data to be downloaded is built (or organized) into bundles (e.g., a personal storage table (PST)). The bundles may be downloaded to the local cache when network resources allow, providing a scaleable solution to prevent the available network bandwidth from decreasing. The local cache may also be populated with data items just before they are archived in order to reduce downloading archived data items unnecessarily.

Figure 1:
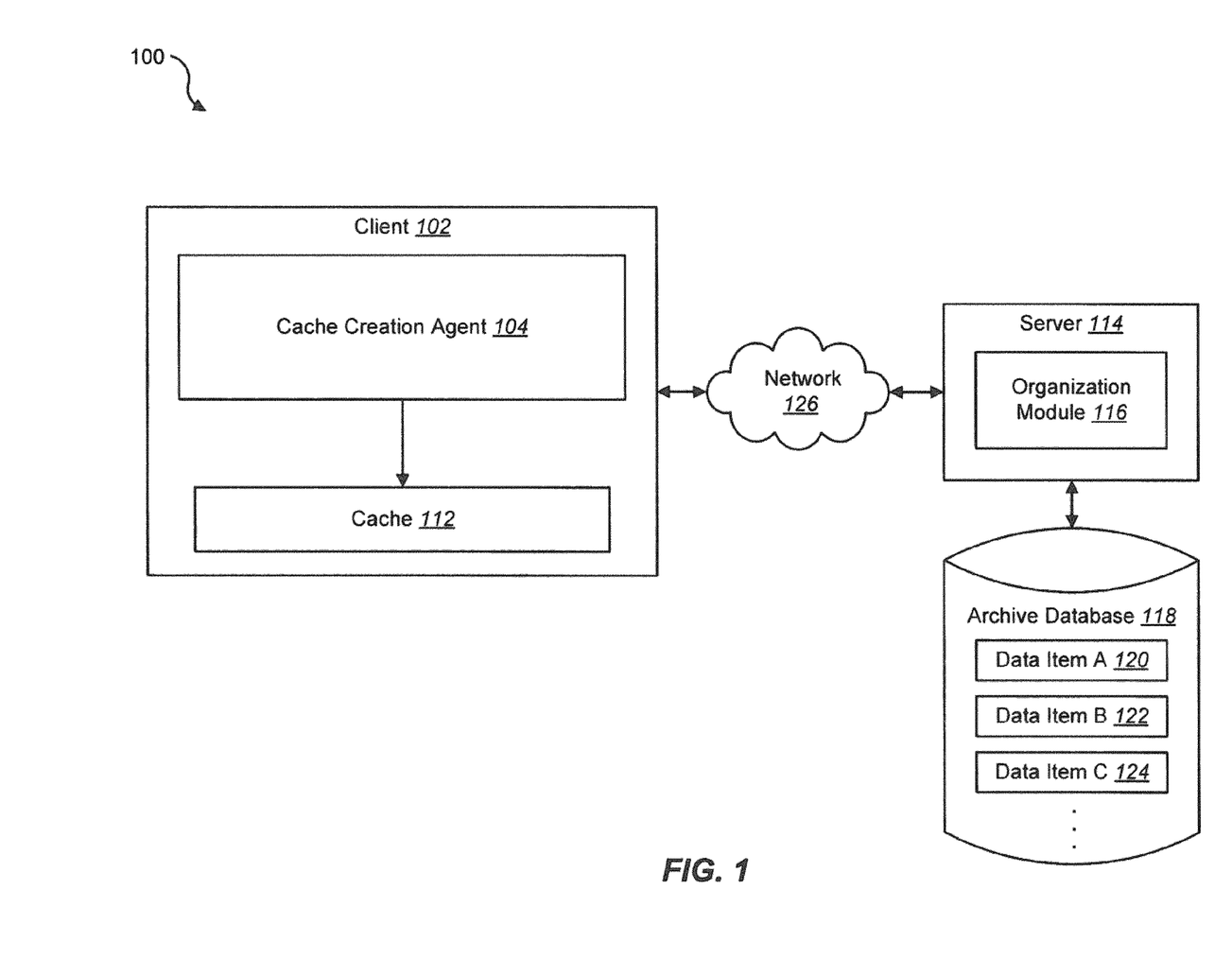
FIG. 1 is a block diagram illustrating one embodiment of a client computing device communicating with a server across a network connection.

FIG. 1 is a block diagram illustrating one embodiment of a client computing device 102 communicating with a server 114 across a network connection 126. In one configuration, the client 102 may be a personal computer (PC), a laptop, a personal digital assistant (PDA), a mobile communications device, or any other type of computing device. The client 102 may include a cache creation agent 104 that may build, populate, and maintain a local cache 112. The agent 104 may build and populate the cache 112 based on information received from the server 114 across the network connection 126.

The server 114 may include an organization module 116. The client 102 may request the server 114 to organize the archived data items and the organization module 116 may then organize the various data items 120, 122, 124 archived in an archive database 118. For example, the archive database 118 may include data item A 120, data item B 122, and data item C 124. Although the archive database 118 is illustrated with three data items 120, 122, 124, it is to be understood that the archive database 118 may include more or less than three archived data items. In one embodiment, the organization module 116 may organize the various data items 120, 122, 124 into bundles or packages. These bundles may be sent to the cache creation agent 104 across the network connection 126. The agent 104 may populate the local cache 112 with the data items included in the bundles. In one configuration, the data items 120, 122, 124 may include email communications or messages, files, images, etc.

Figure 2:
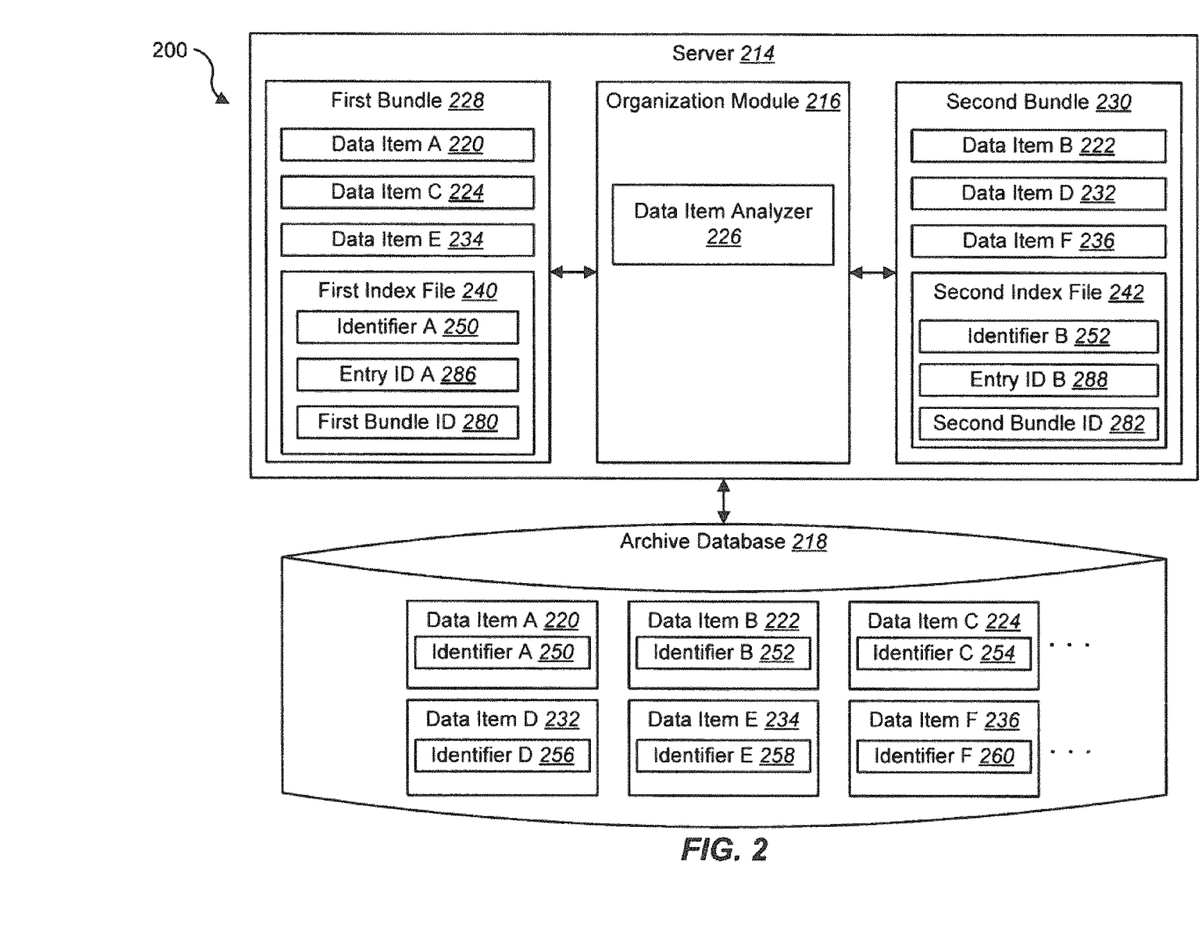
FIG. 2 is a block diagram illustrating a further embodiment of a server organizing various data items stored in an archived database.

FIG. 2 is a block diagram illustrating a further embodiment of a server 214 organizing various data items stored in an archive database 218. The archive database 218 may include a database identifier 284 that may uniquely identify the database 218.

In one configuration, the server 214 may access the archive database 218 that stores one or more archived data items 220, 222, 224, 232, 234, 236. Each archived data item in the database 218 may include an identifier 250, 252, 254, 256, 258, 260. The identifier may be a globally unique identifier for each archived data item. For example, the identifier 250, 252, 254, 256 may be a unique identifier that is assigned to each data item when the item is archived in the database 218. As an example, data item A 220 may be identified by identifier A 250. In one embodiment, identifier A 250 may be a certain identifier that uniquely identifies data item A 220 within the archive database 218. Identifier A 250 may be assigned to data item A 220 when data item A 220 is archived in the database 218. At a subsequent time, data item B 222 may be archived in the database 218. When the item 222 is archived, identifier B 252 may be assigned to data item B 222 that is a globally unique identifier for data item B 222.

In addition, each data item may be assigned a sequence number that is unique to a particular database. For example, data items 220, 222, 224, 232, 234, and 236 may be assigned a sequence number that is unique to the database 218. In one configuration, the sequence numbers may be incremental increases from each other. For example, data item A 220 may be assigned a sequence number that is unique to the database 218. At a subsequent time, data item B 222 may be assigned a sequence number that is an incremental increase from the sequence number assigned to data item A 220.

In one embodiment, the server 214 may include an organization module 216. The module 216 may include a data item analyzer 226. In one embodiment, the analyzer 226 may analyze one or more archived data items 220, 222, 224, 232, 234, 346 that are stored within the archive database 218. Based on the analysis of the various data items, the organization module 216 may organize copies of the archived data items into one or more bundles 228, 230. For example, based on the analysis provided by the data item analyzer 226, the organization module 216 may create a first bundle 228 that includes data item A 220, data item C 224, and data item E 234. Similarly, the organization module 216 may create a second bundle 230 that includes data item B 222, data item D 232, and data item F 236.

In one configuration, each bundle 228, 230 may represent a particular quarter of a calendar year. For example, the first bundle 228 may represent the first quarter (i.e., January-March) of a year and the second bundle 230 may represent the second quarter (i.e., April-June) of a year. In one embodiment, data items may be added to a bundle relevant to a particular quarter in descending sequence number order. As a result, additional bundles of data items may be created for the same quarter if size constraints, settings, etc. prevent all of the data items from the quarter from being placed in the same bundle. Subsequent bundles that include data items from subsequent quarters may start from the "sequence number-1" of the previous bundle.

In one example, the data items included in the first bundle 228 may be data items that were originally created during the first quarter of the year. Similarly, data items included in the second bundle 230 may be data items that were originally created during the second quarter of the year. Further, an entry ID may be generated for each data item placed in a bundle 228, 230. The entry ID may be used to locate a particular data item with a bundle 228, 230. In one embodiment, the creation of an additional bundle representing the same time period of a previously created bundle may be initiated if, for example, the previously created bundle exceeds certain constraints associated with the server (e.g., size constraints, etc.)

In one configuration, each bundle 228, 230 may include a bundle identifier 280, 282. For example, the first bundle 228 may include a first bundle ID 280. Similarly, the second bundle 230 may include a second bundle ID 282. The bundle identifiers 280, 282 may indicate which quarter the particular bundle represents. For example, the first bundle ID 280 may indicate that the first bundle 228 represents the first quarter of the year.

In addition, each bundle 228, 230 may include an index file 240, 242. For example, the first bundle 228 may include a first index file 240 that may include (for each data item) a list of identifiers (e.g., globally unique identifier and an entry ID) assigned to each data item included in the first bundle 228 as well as the bundle ID. For simplicity, the first index file 240 is only illustrated as including identifiers for data item A 220 (e.g., identifier A 250 and an entry ID A 286). It should be understood, however, that the first index file 240 may also include identifiers (e.g., globally unique identifier and an entry ID) and a bundle ID for each data item included in the first bundle 228.

As previously explained, the first bundle 228 may include data item A 220, data item C 224, and data item E 234. As a result, the first index file 240 may include identifier A 250, identifier C 254, identifier E 258, an entry ID for each data item, as well as the first bundle ID 280 that is specific to the first bundle 228.

In a similar manner, the second index file 242 within the second bundle 230 may include identifiers for the data items organized in the second bundle 230, as well as a second bundle ID 282 that identifies the second bundle 230. For simplicity, the second index file 242 is only illustrated as including identifiers for data item B 222 (e.g., identifier B 252 and an entry ID B 288). It should be understood, however, that the second index file 242 may also include identifiers (e.g., globally unique identifier and an entry ID) and a bundle ID for each data item included in the second bundle 230.

Figure 3:
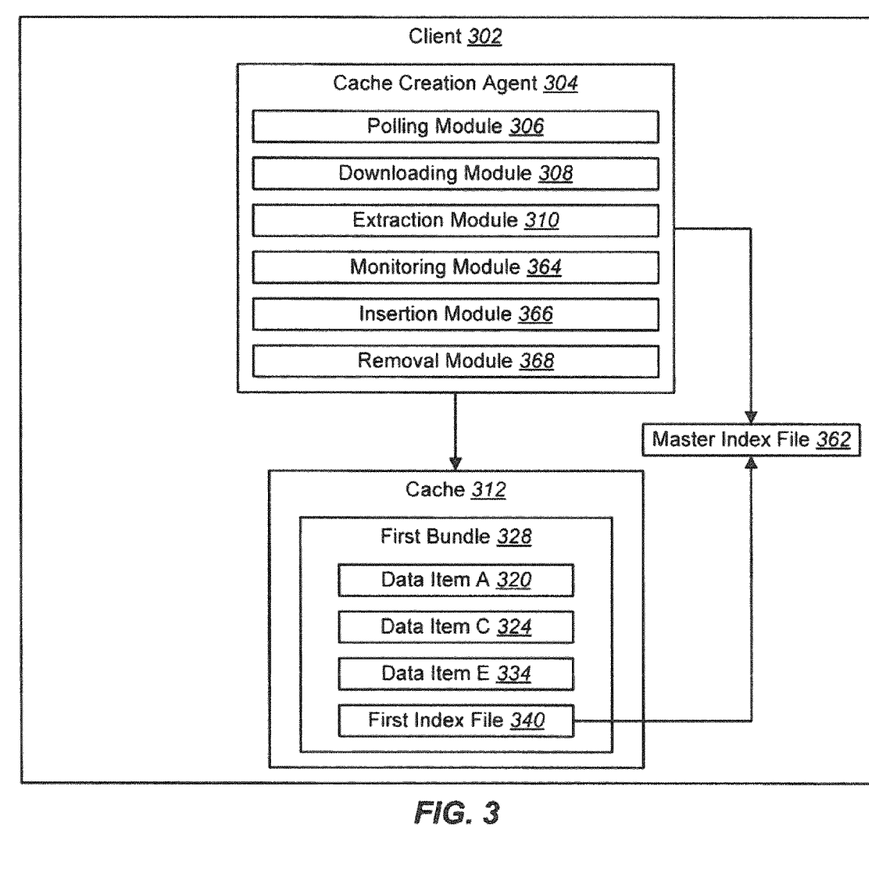
FIG. 3 is another embodiment of a client computing device that may implement the present systems and methods.

FIG. 3 is another embodiment of a client computing device 302 that may implement the present systems and methods. In one configuration, the client 302 may include a cache creation agent 304. The agent 304 may build, populate, and maintain a local cache 312 on the client computing device 302. In one configuration, the cache creation agent 304 may include a polling module 306. The polling module 306 may continuously poll the server 114 to determine if the server 114 has successfully organized or bundled together copies of data items archived in the archive database 118. In addition, the agent 304 may include a downloading module 308 that may download the bundles of data items organized by the server 114. The downloading module 308 may download the bundles when the polling module 306 determines that the server has successfully organized the archived data items into bundles.

When the downloading module 308 downloads a bundle of data items, the bundle of data items may be stored in the local cache 312. For example, the downloading module 308 may download a first bundle 328 that includes data item A 320, data item C 324, and data item E 334. In one embodiment, the first bundle 328 may also include a first index file 340 that may include identifiers for each data item in the first bundle 328, as well as a unique identifier for the first bundle 328. For example, the first index file 340 may include the globally unique identifier and the entry ID for each data item in the first bundle 328. The index file 340 may also include the first bundle ID that uniquely identifies the first bundle 328.

The cache creation agent 304 may include an extraction module 310 that may extract certain information from the first bundle 328 of data items stored in the local cache 312. For example, the extraction module 310 may extract information from the first index file 340, such as the identifiers for each data item in the bundle and the unique identifier for the bundle itself. This extracted information may be stored or added to a master index file 362. As a result, for each bundle downloaded to the local cache 312, the extraction module 310 may extract the identifiers for each data item, as well as the identifier for each bundle. These various identifiers may be stored in the master index file 362. In one embodiment, a user may access the master index file 362 in order to quickly and accurately locate and retrieve a particular data item from a particular bundle stored in the local cache 312.

The cache creation agent 304 may further include a monitoring module 364 that may monitor the local disk space of the client 302. If the monitoring module 364 determines that the occupied space of the local disk surpasses a particular threshold, a removal module 368 may remove one or more data items stored in the local cache 312. In one embodiment, the data item associated with a certain time period may be removed first. For example, the data item that was created before the other data items in the local cache 312 may be removed from the local cache 312. The time period may be determined for a data item based on the type of item and its corresponding various date properties. For example, date properties may include a message delivery time, a sent time, a last modified time, a created time, etc.

In another embodiment, the cache creation agent 304 may include an insertion module 366. The insertion module 366 may allow a user to manually store a data item directly in the local cache 312. In other words, if a data item is manually stored in the local cache, there may be no need for the data item to be first archived and then retrieved from the archive database 118 to be placed in the local cache 312.

Figure 4:
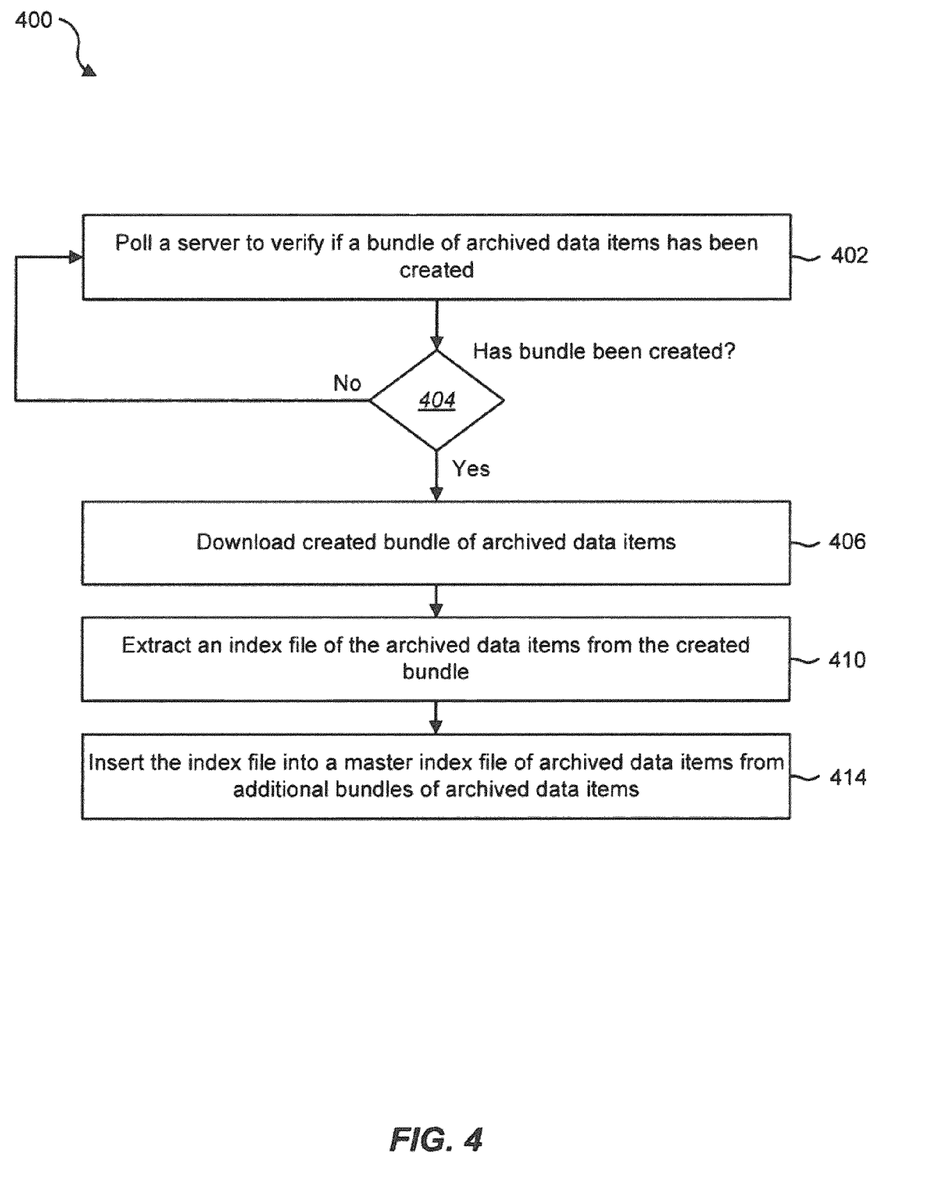
FIG. 4 is a flow diagram illustrating one embodiment of a method for downloading a bundle of archived data items.

FIG. 4 is a flow diagram illustrating one embodiment of a method 400 for downloading a bundle of archived data items. In one configuration, the method 400 may be implemented by the cache creation agent 104.

In one example, a server may be polled 402 in order to verify if a bundle of archived data items has been successfully created. A determination 404 may be made as to whether the bundle has been created. If is determined 404 that the bundle has not been created, the method 400 may return to continue to poll the server in order to verify if the bundle has been created. If, however, it is determined 404 that the bundle has been successfully created, the created bundle of archived data items may be downloaded 406. In addition, an index file of the archived data items may be extracted 410 from the created bundle. In one embodiment, the extracted index file may be inserted 414 into a master index file of archived data items. In one configuration, the master index file may also include index files relating to additional bundles of archived data items that have been downloaded. As a result, the master index file may include identifiers (e.g., globally unique identifiers and entry IDs) for each data item downloaded or stored to a local cache. The master index file may also include identifiers for each bundle of data items downloaded by the client computing device 102.

Figure 5:
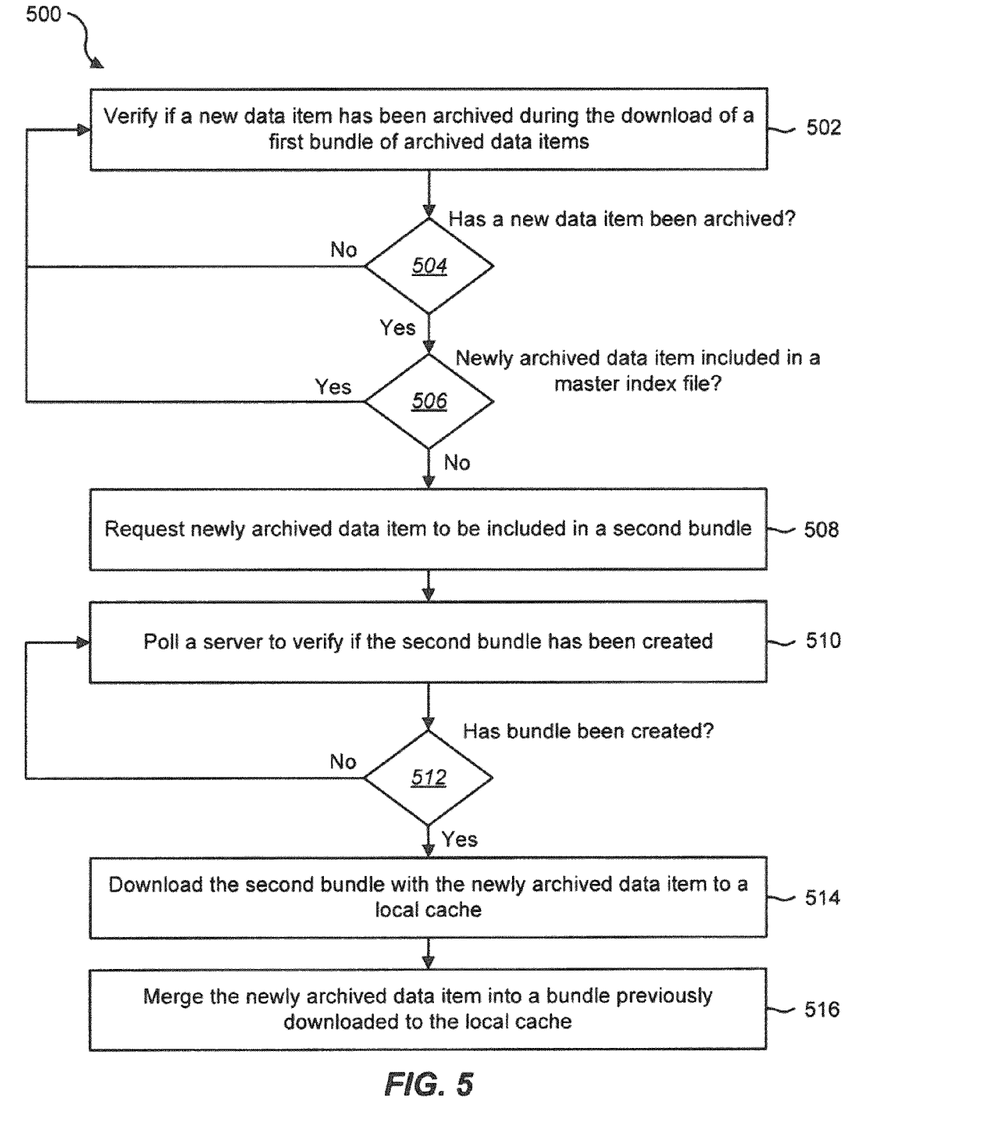
FIG. 5 is a flow diagram illustrating one embodiment of a method for downloading data items that may have been archived after an initial download of data items has been initiated.

FIG. 5 is a flow diagram illustrating one embodiment of a method 500 for downloading data items that may have been archived after an initial download of data items has been initiated. In one configuration, the method 500 may be implemented by the cache creation agent 104.

In one embodiment, the method 500 may verify 502 if a new data item has been archived to an archive database 118 during the download of a first bundle of archived data items. A determination 504 may be made as to whether a new data item has been archived. If it is determined 504 that a new data item has not been archived during the download of a first bundle of archived data items, the method 500 may return to continue to verify 502 if new data items have been archived during the download of a first bundle of archived data items.

If, however, it is determined 504 that a new data item has been archived, a determination 506 may be made as to whether the newly archived data item is included in a master index file. If it is determined 506 that the newly archived data items is included in the master index file, the method 500 may return to verify 502 if new data items have been archived. If, however, it is determined 506 that the newly archived data item is not included in the master index file, the newly archived data item may be requested 508 to be included in a second bundle.

In one configuration, a data item may be copied to the local cache before the data item is archived. In one example, an identifier for the data item may not exist because the item has not been archived. As a result, a new property may be present in the master index file for the data item. The new property may be a hash of five known properties of the data item (e.g., subject, author, date (calculated in manner previously described), message class, message importance, etc.) A determination 506 may be made as to whether the data item is in the local cache. In one configuration, the same hash may be created and compared with any existing hash values. If a match occurs, the supplied identifier may be added to the entry in the master index file associated with this data item.

In one embodiment, a server may be polled 510 in order to verify if the second bundle has been successfully created with the newly archived data item. A determination 512 may be made as to whether the second bundle has been created. If it is determined 512 that the second bundle has not been created, the method 500 may return to poll 510 the server in order to verify if the second bundle has been created. If, however, it is determined 512 that the second bundle has been created, the second bundle with the newly archived data item may be downloaded 514 to a local cache. In addition, the newly archived data item may be merged 516 into a bundle that has been previously downloaded to the local cache. For example, if the data items are organized into bundles that represent the quarters of the year, the newly archived data item may be merged into the bundle that represents the quarter of the year in which the newly archived data item was originally created.

Figure 6:
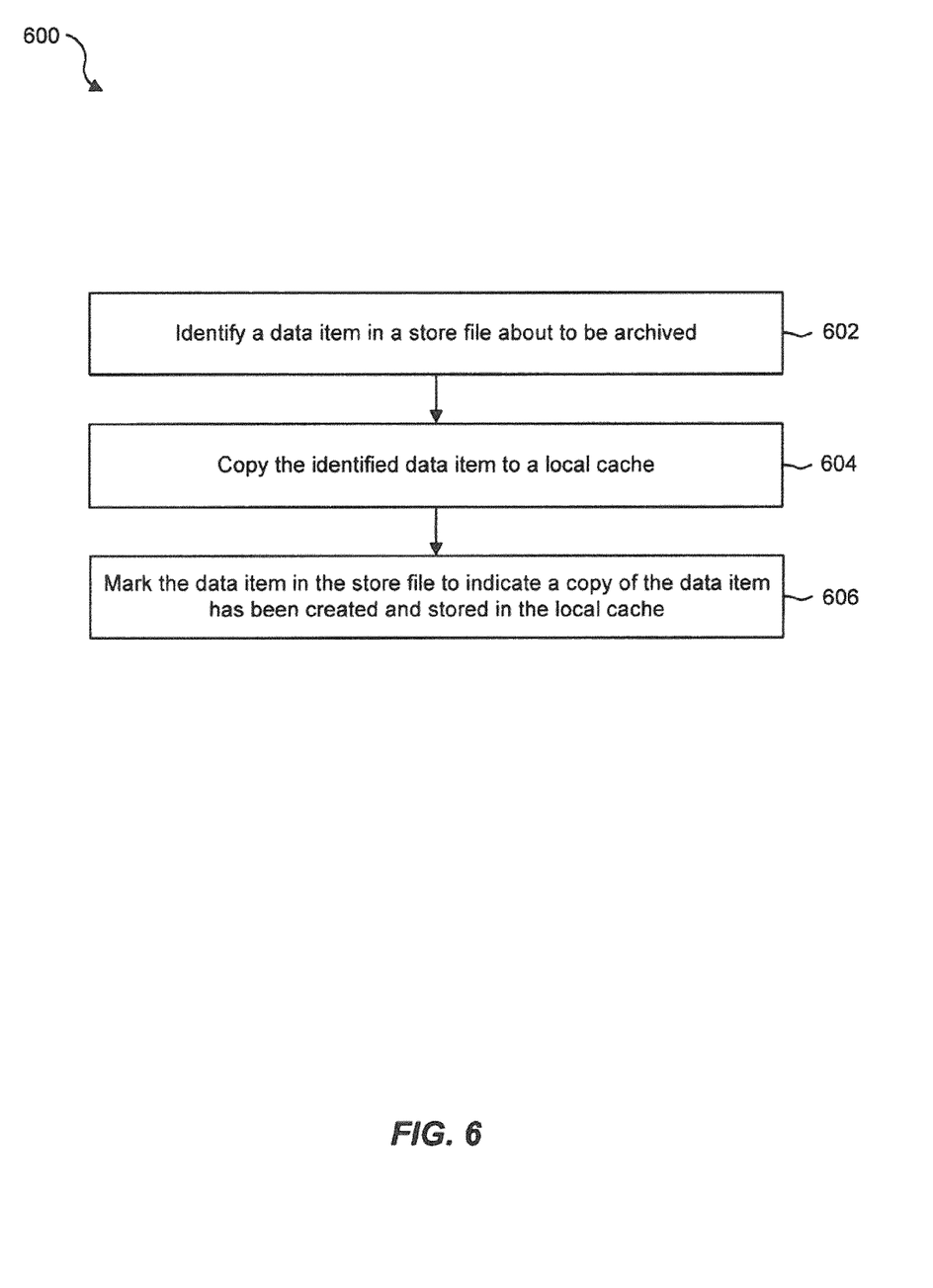
FIG. 6 is a flow diagram illustrating one embodiment of a method for manually downloading or copying a data item to a local cache before the data item is archived.

FIG. 6 is a flow diagram illustrating one embodiment of a method 600 for manually downloading or copying a data item to a local cache before the data item is archived. In one embodiment, the method 600 may be implemented by the cache creation agent 104.

In one configuration, a data item that is about to be archived may be identified 602. The identified data item may be copied 604 to a local cache. In addition, the data item may be marked 606 in order to indicate that a copy of the data item has been created and stored in the local cache. This mark may prevent the data item from being archived and then a copy of the archived data item from being downloaded back to the local cache.

Figure 7:
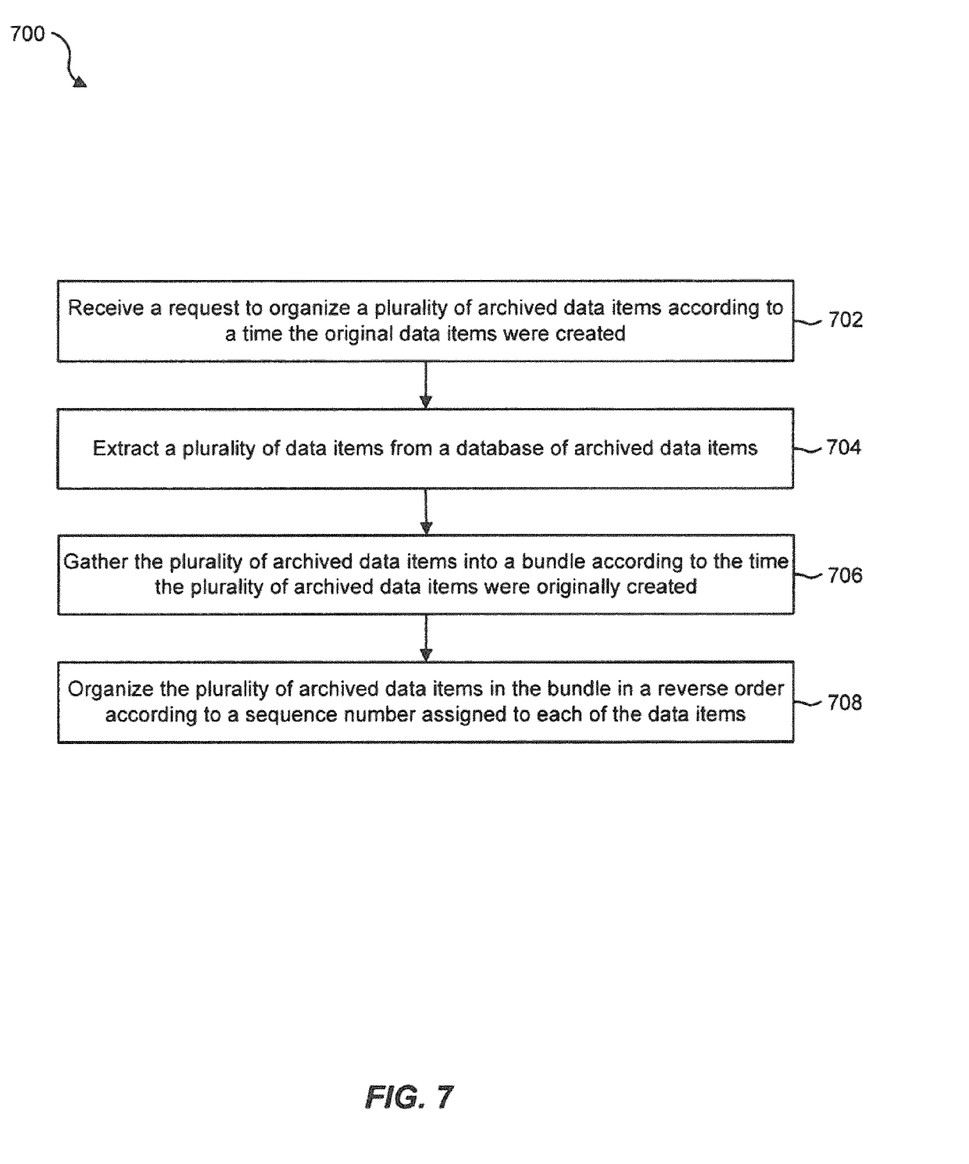
FIG. 7 is a flow diagram illustrating one embodiment of a method for organizing a plurality of data items into a bundle.

FIG. 7 is a flow diagram illustrating one embodiment of a method 700 for organizing a plurality of data items into a bundle. In one embodiment, the method 700 may be implemented by the organization module 116 on the server 114.

In one configuration, a request to organize a plurality of archived data items is received 702. The received request may request that the plurality of archived data items be organized according to a time the original data items were created. For example, the plurality of data items may be organized into bundles representing one of the quarters of a year. A plurality of archived data items may be extracted 704 from a database of archived data items. In one configuration, each of the plurality of archived data items may be gathered 706 into a bundle according to the time the archived data item was originally created. Further, each of the plurality of archived data items may be organized 708 into the bundle in a reverse order according to a sequence number assigned to each of the data items. In other words, the first archived data item placed in the bundle may be the most recent data item that was archived.

Figure 8:
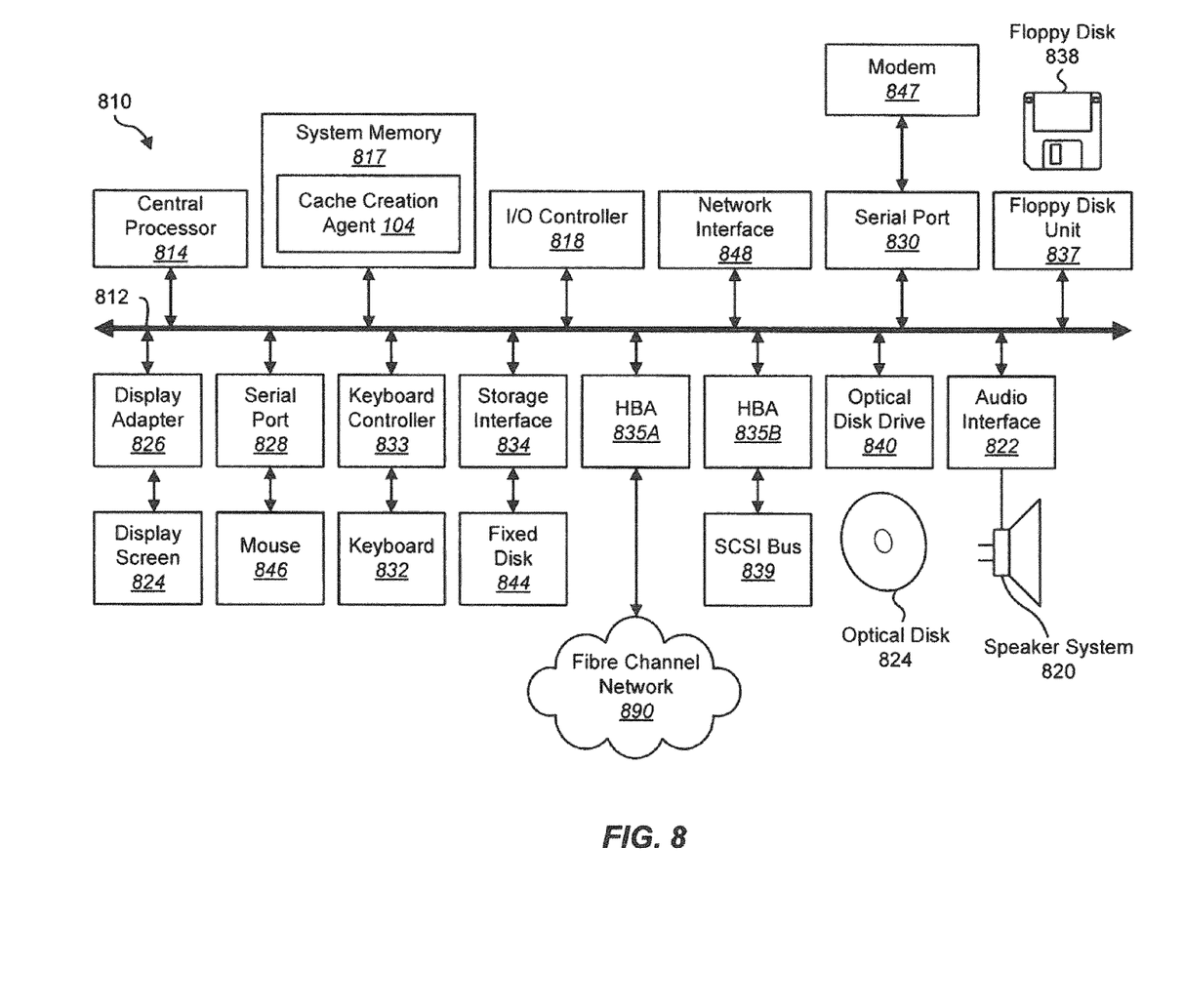
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the cache creation agent 104 to implement the present systems and methods may be stored within the system memory 817. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
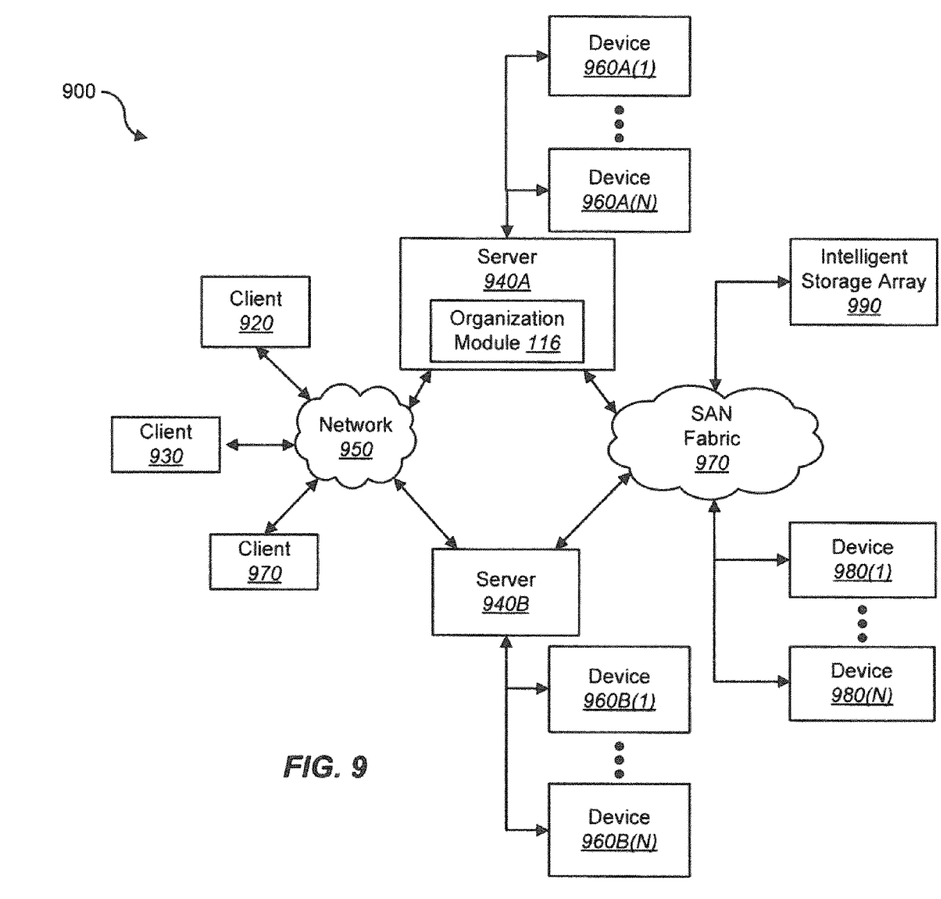
FIG. 9 is a block diagram depicting a network architecture in which client systems, as well as storage servers are coupled to a network.

FIG. 9 is a block diagram depicting a network architecture 900 in which client systems 910, 920 and 930, as well as storage servers 940A and 940B (any of which can be implemented using computer system 910), are coupled to a network 950. In one embodiment, the organization module 116 may be located within a server 940A, 940B to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920 and 930 to network 950. Client systems 910, 920 and 930 are able to access information on storage server 940A or 940B using, for example, a web browser or other client software (not shown). Such a client allows client systems 910, 920 and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for populating and maintaining a local cache of a client machine with archived data items, comprising:
   sending a request over a network connection from the client machine to a server to organize, at the server, archived data items stored in an archive database into one or more bundle files according to a time period associated with each archived data item, the one or more bundle files comprising a predetermined file format;
   including, at the server, an index file in each of the one or more bundles files;
   upon determining that the server is finished organizing the archived data items into the one or more bundle files, downloading, to the local cache, the one or more bundle files of archived data items;
   extracting an index file from each of the one or more bundle files, wherein an extracted index file comprises a list of identifiers for each archived data item placed in one of the one or more bundle files, the list of identifiers comprising a data item identifier identifying a particular data item, the data item identifier being assigned to the particular data item when the particular data item is archived in the archive database, an entry identifier to locate the particular data item in a particular bundle, the entry identifier being generated when the particular data item is added to the bundle, and a bundle identifier identifying the particular bundle and indicating the time period associated with each archived data item placed in the particular bundle, the bundle identifier being generated when the particular bundle is created;
   inserting the extracted index file into a master index file; and
   accessing at least a portion of the one or more bundle files of archived data items on the local cache of the client machine in the absence of the network connection to the server.

2. The method of claim 1, further comprising verifying whether one or more additional data items have been archived subsequent to sending the request to organize archived data items into the one or more bundle files.

3. The method of claim 2, further comprising sending a request to organize the one or more additional data items into an additional bundle.

4. The method of claim 3, further comprising downloading the additional bundle of the one or more additional data items to the local cache.

5. The method of claim 4, further comprising merging the one or more additional data items into a bundle previously downloaded to the local cache.

6. The method of claim 1, further comprising verifying whether an occupied space threshold relating to the available space of a local disk is satisfied.

7. The method of claim 6, further comprising preventing the downloading of the one or more bundle files upon verification that the occupied space threshold is satisfied.

8. The method of claim 6, further comprising selecting a bundle to remove from the local cache upon verification that the occupied space threshold is satisfied.

9. The method of claim 1, wherein the client machine connects to the server over the network connection from a location remote to the server.

10. The method of claim 1, wherein the network connection comprises a type of connection selected from an internet connection, a cellular connection, an Ethernet connection, or a wireless connection.

11. The method of claim 1, further comprising:
    extracting from each of the one or more bundle files a data item index for each archived data item in the one or more bundle files; and
    extracting a bundle index from each of the one or more bundle files.

12. A computer system configured to populate and maintain a local cache of a client machine with archived data items, comprising:
    a processor;
    memory in electronic communication with the processor;
    instructions stored in the memory, the instructions being executable by the processor to:
      send a request over a network connection from the client machine to a server to organize, at the server, archived data items stored in an archive database into one or more bundle files according to a time period associated with each archived data item;
    include, at the server, an index file in each of the one or more bundles files;
    upon determining that the server is finished organizing the archived data items into the one or more bundle files, download, to the local cache, the one or more bundle files of archived data items;
    extract an index file from each of the one or more bundle files, wherein an extracted index file comprises a list of identifiers for each archived data item placed in one of the one or more bundle files, the list of identifiers comprising a data item identifier identifying a particular data item, the data item identifier being assigned to the particular data item when the particular data item is archived in the archive database, an entry identifier to locate the particular data item in a particular bundle, the entry identifier being generated when the particular data item is added to the bundle, and a bundle identifier identifying the particular bundle and indicating the time period associated with each archived data item placed in the particular bundle, the bundle identifier being generated when the particular bundle is created;
    insert the extracted index file into a master index file; and
    access at least a portion of the one or more bundle files of archived data items on the local cache of the client machine in the absence of the network connection to the server.

13. The computer system of claim 12, wherein the instructions are executable by the processor to:
    verify whether one or more additional data items have been archived subsequent to sending the request to organize archived data items into the one or more bundle files.

14. The computer system of claim 13, wherein the instructions are executable by the processor to:
    send a request to organize the one or more additional data items into an additional bundle.

15. The computer system of claim 14, wherein the instructions are executable by the processor to:
    download the additional bundle of the one or more additional data items to the local cache.

16. The computer system of claim 15, wherein the instructions are executable by the processor to:
merge the one or more additional data items into a bundle previously downloaded to the local cache.

17. The computer system of claim 12, wherein the instructions are executable by the processor to:
verify whether an occupied space threshold relating to the available space of a local disk is satisfied.

18. A computer-program product for populating and maintaining a local cache of a client machine with archived data items, the computer-program product comprising a non-transitory computer-readable medium storing instructions thereon, the instructions being executable by a processor to:
send a request over a network connection from the client machine to a server to organize, at the server, archived data items stored in an archive database into one or more bundle files according to a time period associated with each archived data item;
include, at the server, an index file in each of the one or more bundles files;
upon determining that the server is finished organizing the archived data items into the one or more bundle files, download, to the local cache, the one or more bundle files of archived data items;
extract an index file from each of the one or more bundle files, wherein an extracted index file comprises a list of identifiers for each archived data item placed in one of the one or more bundle files, the list of identifiers comprising a data item identifier identifying a particular data item, the data item identifier being assigned to the particular data item when the particular data item is archived in the archive database, an entry identifier to locate the particular data item in a particular bundle, the entry identifier being generated when the particular data item is added to the bundle, and a bundle identifier identifying the particular bundle and indicating the time period associated with each archived data item placed in the particular bundle, the bundle identifier being generated when the particular bundle is created;
insert the extracted index file into a master index file; and
access the one or more bundle files of archived data items on the local cache of the client machine in the absence of the network connection to the server.

* * * * *